(12) United States Patent
Almy (10) Patent No.: US 9,985,576 B2
(45) Date of Patent: May 29, 2018

(54) MOUNTING SYSTEM FOR PHOTOVOLTAIC MODULES

(71) Applicant: SolarCity Corporation, San Mateo, CA (US)

(72) Inventor: Charles Almy, Berkeley, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days. days.

(21) Appl. No.: 14/998,380

(22) Filed: Dec. 23, 2015

(65) Prior Publication Data
US 2017/0187324 A1 Jun. 29, 2017

(51) Int. Cl.
*E04D 13/18* (2018.01)
*H02S 20/23* (2014.01)
*F24J 2/52* (2006.01)

(52) U.S. Cl.
CPC ............... *H02S 20/23* (2014.12); *F24J 2/52* (2013.01)

(58) Field of Classification Search
CPC .................................... H02S 20/23; F24J 2/52
USPC ............. 52/704, 173.3, 698; 292/336.3, 347
See application file for complete search history.

(56) References Cited

U.S. PATENT DOCUMENTS

| | | | | |
|---|---|---|---|---|
| 8,984,818 B2 * | 3/2015 | McPheeters | ........... | F24J 2/5205 52/173.3 |
| 9,496,820 B2 * | 11/2016 | Seery | ....................... | H02S 20/23 |
| 2012/0102853 A1 * | 5/2012 | Rizzo | ..................... | F24J 2/5245 52/173.3 |
| 2012/0111069 A1 * | 5/2012 | Padjen | ..................... | E05C 5/04 70/91 |
| 2013/0133270 A1 * | 5/2013 | West | ......................... | E04B 1/38 52/58 |
| 2014/0175244 A1 * | 6/2014 | West | ..................... | F24J 2/5205 248/316.7 |
| 2015/0280639 A1 * | 10/2015 | Atchley | .................. | H02S 20/23 248/237 |

* cited by examiner

*Primary Examiner* — Brian E Glessner
*Assistant Examiner* — Joshua K Ihezie
(74) *Attorney, Agent, or Firm* — Kilpatrick Townsend & Stockton LLP (57) ABSTRACT

A system for mounting one or more photovoltaic (PV) modules to a structure. The system can include a base having quarter turn receptacles. A coupling member can mate to one of the receptacles to compress a mounting foot to the base and prevent it from moving. A handle attached coupling member can be used to lock the coupling member to the base. A PV module coupling device attached to the foot may support two PV modules.

14 Claims, 12 Drawing Sheets

MOUNTING SYSTEM FOR PHOTOVOLTAIC MODULES

BACKGROUND OF THE INVENTION

There are many systems available for mounting photovoltaic (PV) modules to building structures, such as a roof. These systems serve as a rigid interconnetion element between a roof and a PV module to hold the modules in place and resist the forces of gravity and wind.

Traditional mounting systems consist of rows of rail structures attached to the roof in columns or rows. Module clamps are then used to attach the PV modules to these rail structures. Although effective, these traditional systems require complex and time-consuming installations and utilized relatively large amount of materials. Eventually, pioneers in the solar industry, such as Jack West of San Rafael-based Zep Solar, realized that module frames themselves are sufficiently rigid to function as the rails of a PV mounting system. By utilizing the inherent rigidity of modules frames as part of the PV mounting system, system part counts and costs of PV mounting systems were significantly reduced while installation time and overall aesthetics were improved. This realization caused many in the residential solar industry to move away from rail-based solutions. As a result, the hard costs of solar have steadily declined while the speed with which an array can be installed has steadily increased. However, in order to continue the momentum of solar against other fossil fuel-based energy sources, it is imperative that both hard and soft PV costs continue to be reduced.

With current rail-free systems, installation is accomplished by first installing a flashing, and then lagging a puck to the flashing to provide a stable base on which to install the remaining mounting hardware. Next, a leveling foot or other structure that also supports a two-sided PV module coupling device is bolted to the puck. Typically, the PV module coupling device is first attached to the frame of the down roof PV module and then dropped onto the puck to be bolted down. Then, the PV module in the next row is pivoted into the other side of the PV module coupling device.

Although this process is very fast compared to traditional rail-base systems, it is still dependent on power tools, such as an impact driver, both for lagging the puck into the roof and for bolting the leveling foot down to the puck. Therefore, installation speed is dependent on the number of available impact drivers as well as their battery life, and a bottle neck is created around use of that tool. Accordingly, it is desirable to provide a PV module mounting system that helps mitigate such installation issues.

BRIEF SUMMARY OF THE INVENTION

Some embodiments of the invention are related to mounting system having a base that can be configured to mount to a structure. The base can have at least one receptacle. A foot can be adapted to couple with the base. A photovoltaic (PV) module coupling device can be attached to the foot. The PV module coupling device can be adapted to engage the frames of at least two PV modules while maintaining a space in between them. An elongated handle can be coupled to a coupling member. The coupling member can be configured to secure the foot to the base by insertion of the coupling member through the foot and into the at least one receptacle and turning of the handle less than a full revolution.

Some embodiments of the invention are related to a mounting system having a base configured to mount to a structure. The base can have a plurality of receptacles. The system can include a foot having a bottom surface and an upper surface, the bottom surface being for engagement with the base. A photovoltaic (PV) module coupling device can be mounted above the upper surface of the foot, the PV module coupling device being adapted to engage the frames of at least two PV modules while maintaining a space in between them. An elongated handle can be coupled to a coupling member. The coupling member can be configured to compress the foot between the base and the coupling member by insertion of the coupling member through the foot and into one of the plurality of receptacles and turning of the handle less than 360 degrees.

Some embodiments of the invention are related to a puck that can be configured to mount to a structure. The puck can have an elevated surface having plurality of receptacles. The system can include foot having a bottom surface and an upper surface, the bottom surface for frictional engagement with the elevated surface of the puck. A photovoltaic (PV) module coupling device can be mounted above the upper surface of the foot, the PV module coupling device being adapted to engage the frames of at least two PV modules while maintaining a space in between them. A coupling member can be configured to maintain position of the foot against the base by insertion of the coupling member through the foot and into one of the plurality of receptacles and turning of the coupling member.

In some embodiments, the at least one receptacle can include an opening and at least one stop for limiting turning of the handle.

In some embodiments, the at least one receptacle can include a first surface portion, a second surface portion vertically displaced from the first surface portion and abutting the at least one stop, and a ramp portion leading from first surface portion to the second surface portion.

In some embodiments, the at least one stop can be configured to limit revolution of the elongated handle to 90 degrees or less.

In some embodiments, the coupling member can have an elongated shaft and a key member or key flanges attached to an end of the elongated shaft.

In some embodiments, the key member can include a plurality of curved portions configured to forcibly hold onto complimentary portions of the at least one receptacle.

In some embodiments, the elongated handle can be removably coupled to the coupling member.

In some embodiments, coupling member can have a key member configured to ramp over the ramp portion during the turn of the handle.

In some embodiments, the coupling member can include a feature for coupling to an elongated handle.

In some embodiments, the feature can be a male protrusion.

DETAILED DESCRIPTION OF THE INVENTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the invention is not limited to the embodiments shown, but is to be accorded the widest scope consistent with the principles and features disclosed herein.

Embodiments of the invention are generally directed towards a system for mounting a PV module to a support structure such as a roof surface. The system can include base and mounting foot for supporting a PV module coupling device. The system provides an integrated approach for rigidly fixing the mounting foot to the base in a sufficient manner to permanently support the weight of one or more PV modules. Advantageously, such a system requires little to no tools for installation, and hence installation time is greatly reduced over prior systems that require additional tools and bolting. Here, securement of the mounting foot to the base can be accomplished using a fastening system that requires less than 360 degrees of rotation, and in some cases only about a quarter turn (e.g. 90 degrees or less) of an integrated handle is required. The following description details some examples of such a system.

Figure 1A:
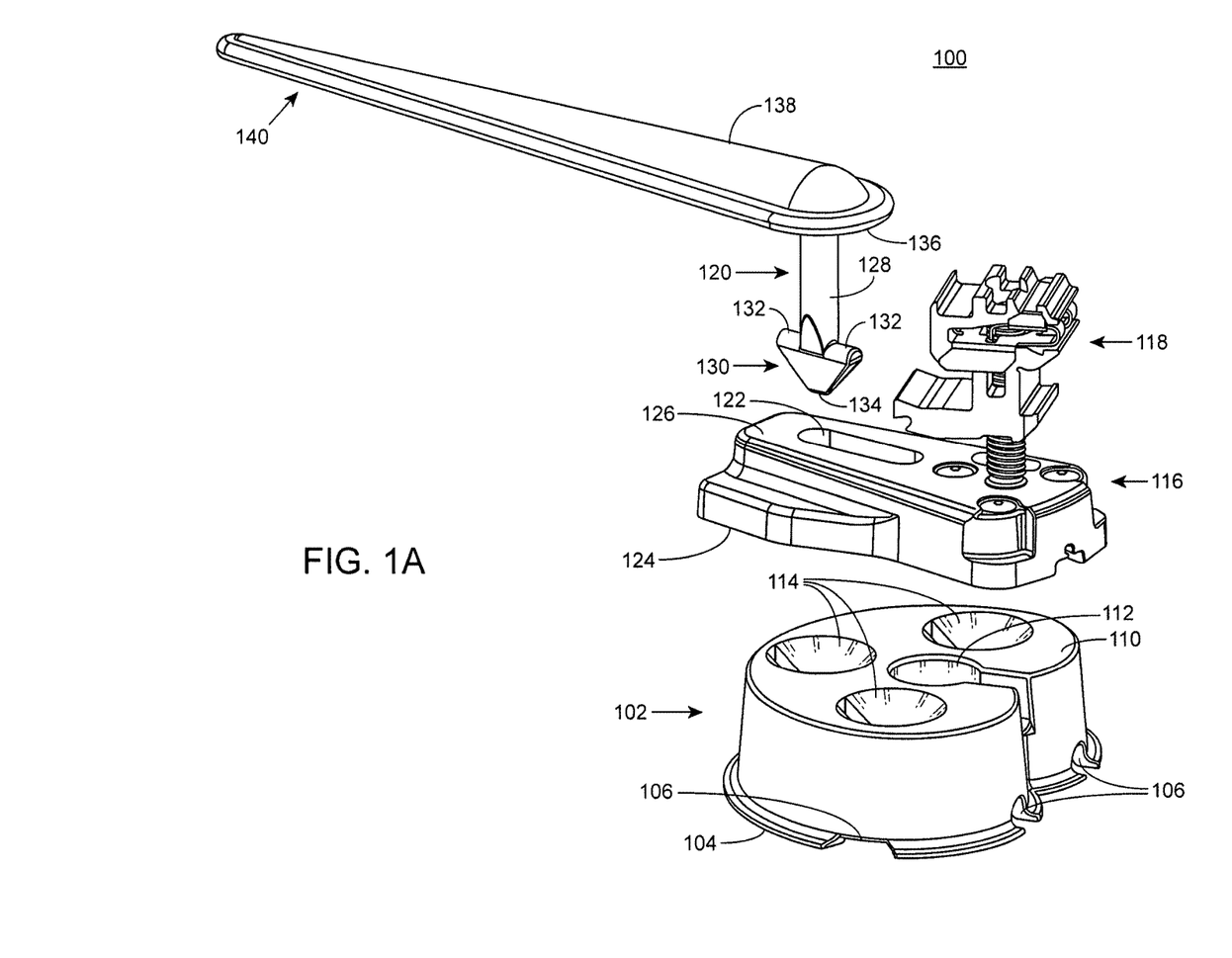
FIGS. 1A and 1B respectively show disassembled and assembled perspective views of a PV mounting system, according to some embodiments.
Figure 1B:
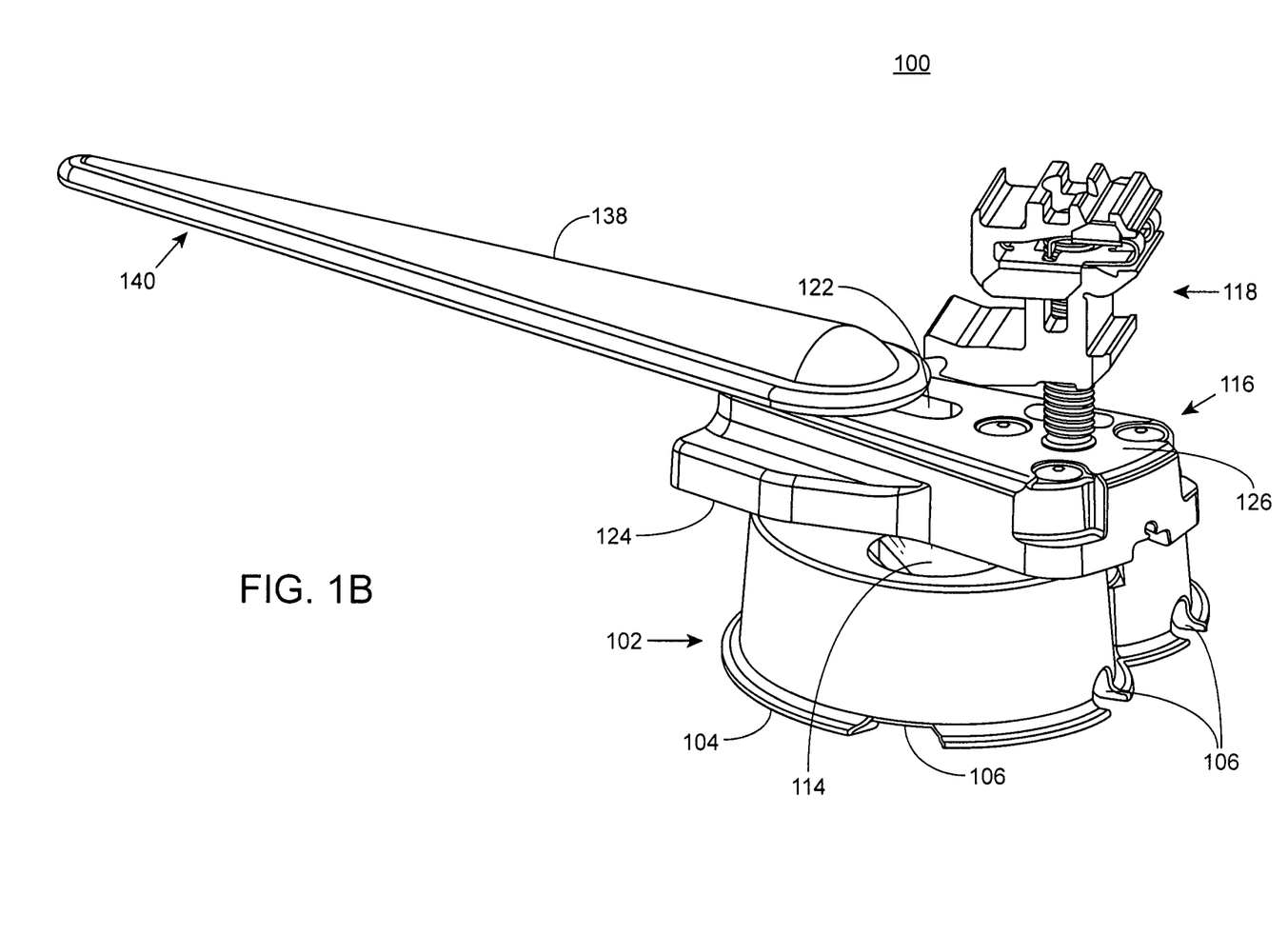

FIGS. 1A and 1B show exploded and assembled views of system 100 for mounting a PV module to a structure, such as a roof, according to various embodiments. System 100 includes base 102, which can be configured for direct mounting to a structure. Alternatively, base 102 may be mounted to flashing or other water-sealing structure. Base 102 can be configured to have a circular puck-like configuration, and hence referred to herein as a puck. Base 102 can be formed from a variety of metals, polymers, and composite materials, and formed through molding, casting, machining, stamping, or 3D printing. In some embodiments, base 102 is integrated with a roof flashing. In other embodiments, base 102 will sit atop roof flashing. Such a flashing may have one or more raised guides to control the location of base 102 on the flashing. Similar mounting pucks and variations including such flashings useable herein are shown at commonly assigned U.S. Pat. No. 8,756,881, which is hereby incorporated by reference in its entirety.

Bottom edge 104 of puck 102 is arranged to directly meet a roof surface, flashing, or other structure, and can include weep holes 106 for drainage. Sidewall 108 leads upward from bottom edge 104 to top surface 110. Top surface 110 includes counter bore 112 with a passage adapted to support a fastener, such as a lag bolt, for mounting base 102 to a structural element, such as a roof rafter. Top surface 110 also includes one or more receptacles 114 configured for mating to a coupling member, and can have a dished surface angled downward from top surface 110. Top surface 110 can be a flat plane that is generally parallel with a plane formed by bottom edge 104, but in some cases can be non-parallel as well. Top surface 110 can also be textured to promote a frictional interface with mounting foot 116.

Mounting foot 116 can take various forms, and here forms an elongated beam to allow for a large range of mounting positions. Mounting foot 116 can be formed from a variety of metals, polymers, and composite materials, and formed through molding, casting, machining, stamping, or 3D printing. Generally, mounting foot will include provisions for supporting PV module coupling device 118 and allowing coupling member 120 to pass through. Mounting foot 116 can be adapted to support a threaded shaft of PV module coupling device 118. Slot 122 can be provided in mounting foot 116, although a circular opening can suffice as well, for allowing coupling member 120 to pass through. Slot 122 will allow the mounting foot 116 to rotated as well moved axially so that PV module coupling device 118 can be positioned at the desired location with respect to the frame of a photovoltaic module. Mounting foot 116 includes bottom surface 124 for mating with top surface 110 of base 102. Upper surface 126 can be parallel to bottom surface 124 and can be smooth to promote a smooth turning interface with coupling member 120, and prevent undesired torqueing of mounting foot 116 during installation.

Figure 6:
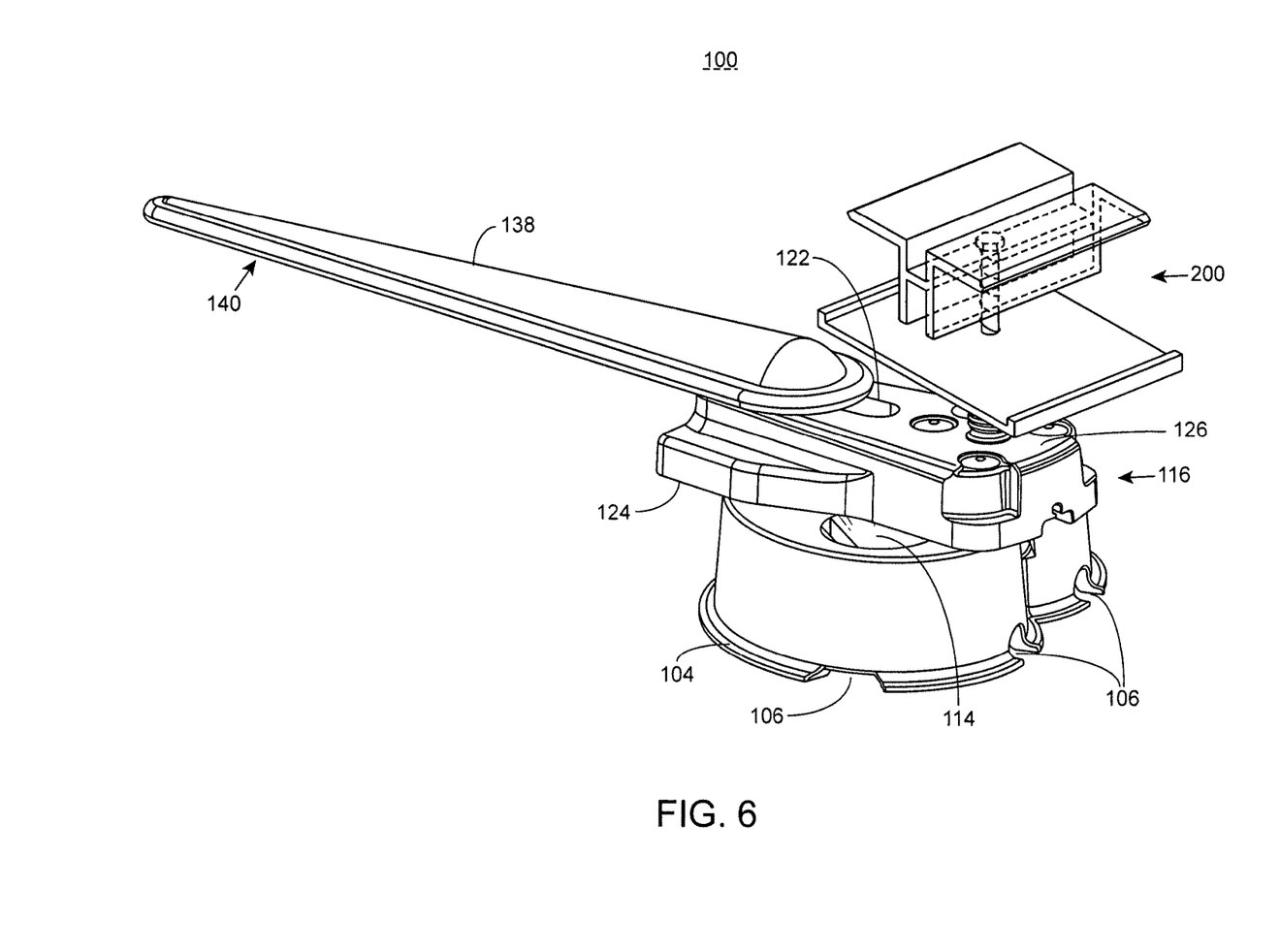
FIG. 6 shows a perspective view of a PV mounting system, according to some embodiments.

PV module coupling device 118 shown at FIGS. 1A and 1B is a "rock-it" style connector manufactured by SolarCity Corp., which is arranged to connect to a groove formed in the frames of two adjacent PV modules. Such a coupling device is described and illustrated, for example, in commonly assigned U.S. patent application Ser. No. 14/615,320, Publication No. 2015/0155823-A1, the disclosure of which is herein incorporated by reference in its entirety. However, system 100 is not limited to use of such a coupling device. A multitude of different styles of coupling devices are compatible with the system, such as, for example, coupling device 200 illustrated at FIG. 6, which depicts a clamping-style coupling device 200 with an upper and lower clamp arranged to clamp the top and bottom portions of a PV module. Such a clamping-style typically includes a top-facing bolt, screw or other fastener that enables an installer to compress the frame of a photovoltaic module between two clamping portions after placement.

Coupling member 120 includes shaft 128 that extends to key member 130. Key member 130 includes key flanges 132, which can have curved profiles. Key member 130 can flatten and/or taper to distal end 134. Key member 130 leads from coupling surface 136, which shares a surface with handle 138. Handle 138 elongates from coupling member 120 to grip portion 140, which here is shown as a tapered end. However, grip portion 140 can include contours for a more ergonomic handgrip. The length of handle 138 is sufficient enough for an installer to apply the required amount of torque for fastening coupling member 120. In some embodiments, handle 138 can be have provisions for attachment to a longer torque arm, such as a wrench or bar.

Handle 138 and coupling member 120 can be formed from a variety of metals, polymers, and composite materials, and formed through molding, casting, machining, stamping, or 3D printing a base material. In some embodiments, handle 138 and coupling member 120 are formed as a single unit, while in other embodiments, coupling member 120 is separately installed onto handle 138 in a permanent fashion for example by welding, bonding, or fastening.

Figure 1C:
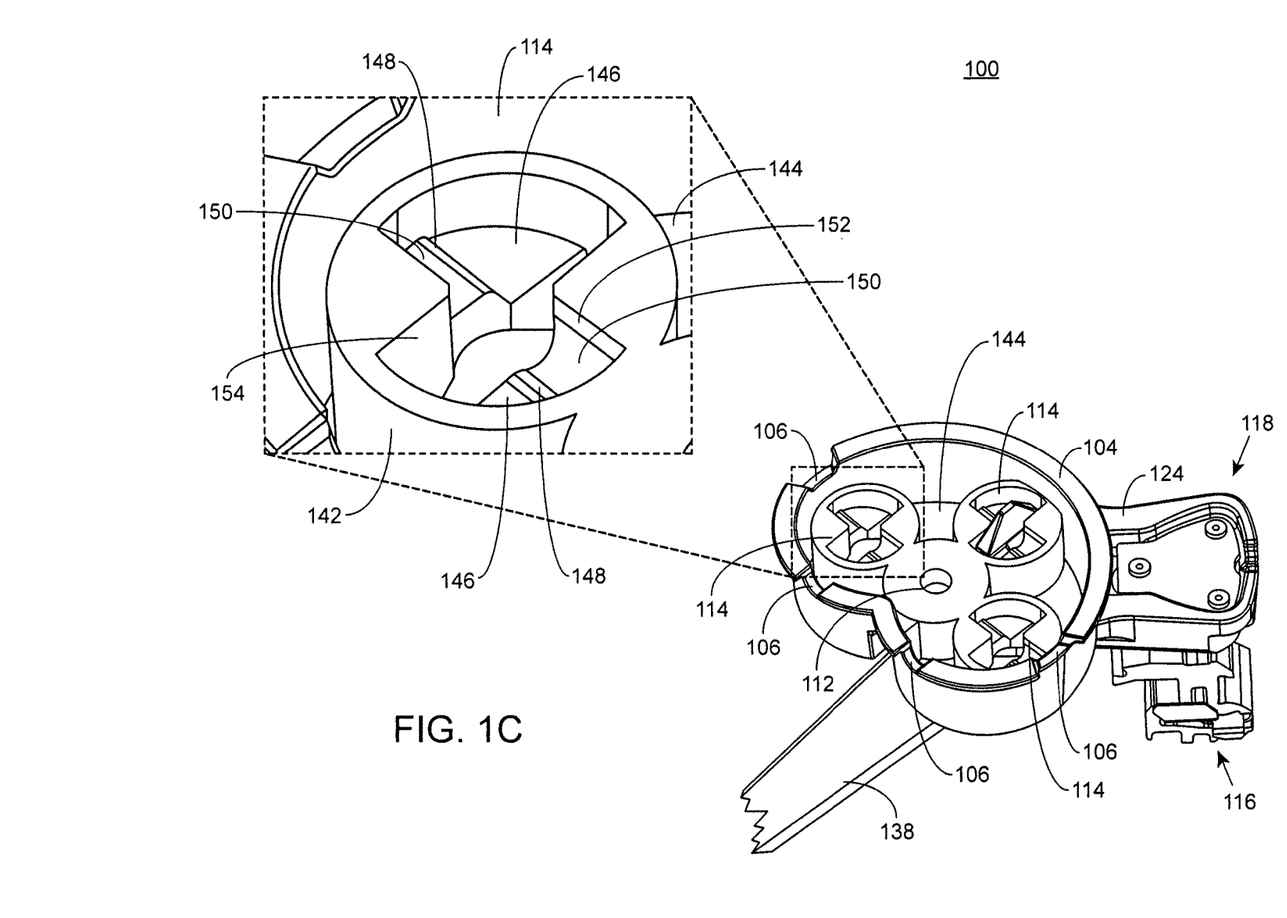
FIG. 1C shows a view of the underside of the PV mounting system of FIGS. 1A and 1B.

FIG. 1C shows a bottom view of system 100. Here, the bottom of base 102 is shown in detail. Each receptacle 114 is defined by circular wall 142 that extends downward from bottom surface 144, which is opposite of top surface 110. Circular wall 142 supports key first surface portions 146, which extend inwardly from circular wall 142 and can be horizontal. First surface portions 146 lead to ramp portions 148, which can have surfaces that angularly extend away from first surface portions 146. Ramp portions 148 can terminate at second surface portions 150, which can be level surfaces that are parallel with and spatially displaced from first surface portions 146. Stop portions 152 abut and can be vertical with respect to second surface portions 150.

Vertical portions 154 define a passage dimensioned to enable key member 130 to pass through. Key flanges 132 can extend vertically past first surface portions 146 when shaft 128 is inserted through slot 122 of mounting foot 116, while coupling surface 136 is in contact with upper surface 126. Alternatively, key flanges 132 can have a line-to-line relationship with first surface portions 146 when shaft 128 is inserted through slot 122 of mounting foot 116, such that light tension of system 100 is achieved when key flanges 132 turn over first surface portions 146.

Ramp portions 148 are displaced vertically away from upper surface 126 of mounting foot 116, while mounting foot 116 is stacked a top base 102, at a distance such that key flanges 132 do not extend vertically past ramp portions 148 and second surface portions 150. However, turning shaft 128 by application of force on handle 138 causes the curved surfaces of key flanges 132 to forcibly ramp up and over ramp portions 148 and then onto second surface portions 150. Further turning of shaft 128 is prevented by distal end 134 of key member 130 abutting stop portions 152.

The vertical displacement between key flanges 132 and coupling surface 136 is less than the vertical displacement between upper surface 126 and second surface portions 150 as stacked at FIG. 1B. Put another way, second surface portions 150 are displaced vertically away from upper surface 126 of mounting foot 116, while mounting foot 116 is stacked a top base 102, at a distance that causes compression of the mounting foot 116 between top surface 110 of base 102 and coupling surface 136 of coupling member 120, after turning of handle 138 and abutment of distal end 134 of key member 130 against stop portions 152. This compression secures mounting foot 116 to base 102 by increasing frictional engagement of bottom surface 124 of mounting foot 116 to top surface 110 of base 102.

The angle between vertical portions 154 and stop portions 152 determines how much of a revolution is required to turn shaft 128 to cause abutment of distal end 134 of key member 130 against stop portions 152. Generally, this angle will require less than 360 degrees of turning by handle 138 and shaft 128. Here, approximately 90 degrees separates vertical portions 154 and stop portions 152, thus requiring a quarter turn of handle 138 to operate. Less or more angle than shown can be provided between vertical portions 154 and stop portions 152, depending on the desired amount revolution of handle 138 for securing mounting foot 116.

It is depicted that each of receptacle 114 is aligned such that vertical portions 154 and stop portions 152 are respectively parallel for each. Hence, initial and final angular positioning of handle 138 is more or less the same for each receptacle. However, in some embodiments, vertical portions 154 and stop portions 152 of each of receptacles 114 can be clocked at some degrees away from one another. This provides different initial and final angular resting positions for handle 138. For example, the final resting position for handle 138 at a first receptacle can be 30 degrees away from the final resting position for handle 138 at a second receptacle and 60 degrees away from the final resting position for handle 138 at a third receptacle. This can be advantageous for providing flexibility to the installer when the final resting position of handle 138 is undesirable for one receptacle, but acceptable for another to position PV module coupling device 118 at the desired location.

Figure 2A:
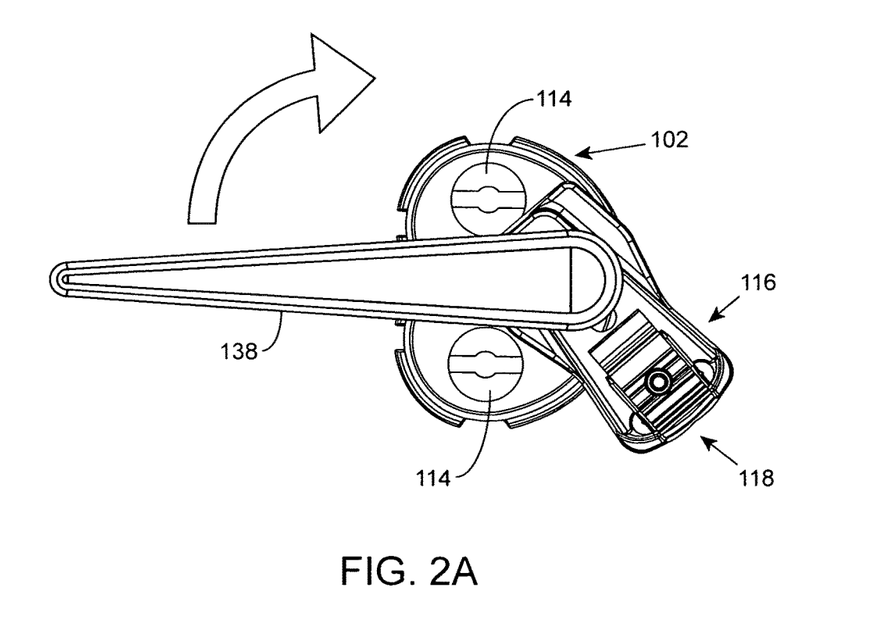
FIGS. 2A-2C show top views of a PV mounting system in use, according to some embodiments.
Figure 2B:
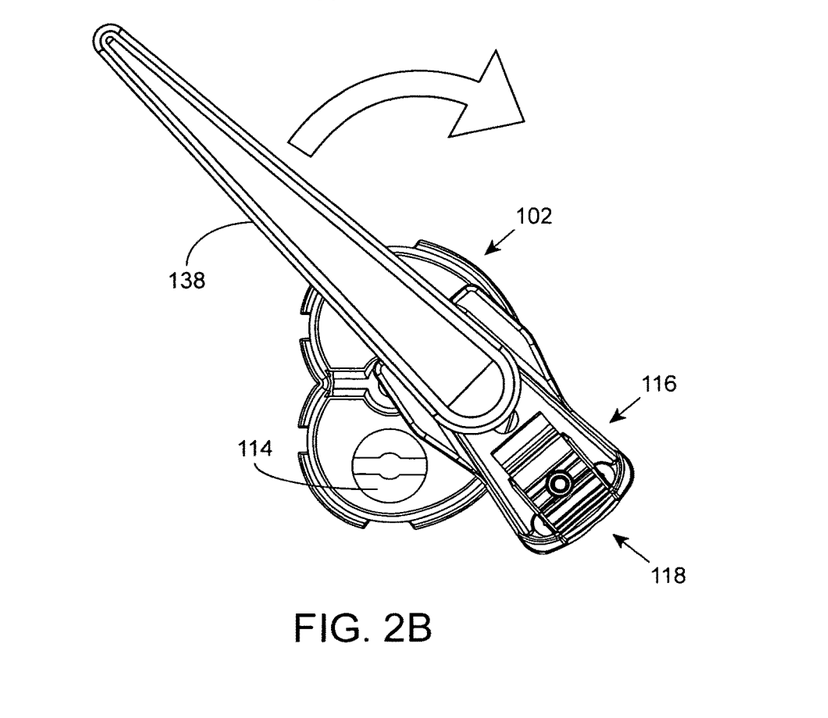
Figure 2C:
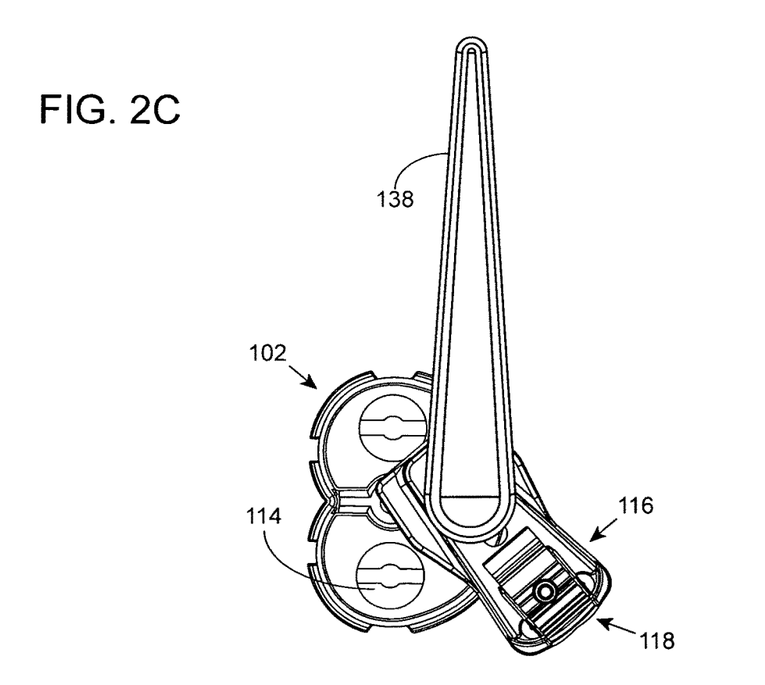

FIGS. 2A-2C depict securements of coupling member 120 to receptacle 114. In use, base 102 is first attached to a roof structure using a mechanical fastener, such as a lag bolt. This may be accomplished by drilling a pilot hole at the desired point in the roof over the roof rafter prior to lagging the lag bolt through base 102. It should be appreciated that although there is only one of counter bore 112 in base portion 102, in various embodiments, it may be desirable to have two or more through-holes to permit more than one fastening point to the roof surface.

At FIG. 2A coupling member 120 is inserted into receptacle 114. In this position, distal end 134 of coupling member 120 abuts vertical portions 154 and handle 138 has not been turned. In addition, mounting foot 116 has been placed on top of base 102. Hence, shaft 128 of coupling member 120 is inserted first through slot 122 of mounting foot 116 and into receptacle 114.

At FIG. 2B, handle 138 has been turned approximately 45 degrees which places key flanges 132 over first surface portions 146. As remarked above, key flanges 132 can extend vertically past first surface portions 146 when shaft 128 is inserted through slot 122 of mounting foot 116, while coupling surface 136 is in contact with upper surface 126. Thus, turning handle 138 to the position shown at FIG. 2B can be accomplished with little force.

Alternatively, key flanges 132 can have a dimensional line-to-line relationship with first surface portions 146 when shaft 128 is inserted through slot 122 of mounting foot 116, such that light tension of system 100 is achieved in the position shown. In that way, position of the mounting foot 116 is maintained when handle 138 is positioned as shown at FIG. 2B without significant application of force, and can easily be repositioned by toggling to the position shown at FIG. 2A. This is a dual-stage fastening approach, where a first amount of relatively low compression force is applied to mounting foot 116 when key flanges 132 contact first surface portions 146, and a second amount of relatively high compression force is applied to mounting foot 116 when key flanges 132 contact second surface portions 150. For example, the low compression force can be 8-45 N of force, while the high compression force can be 220-440 N of force.

Rotation of handle 138 may be inhibited by ramp portions 148. To overcome this, significant torque can be applied to shaft 128 by increasing hand force to handle 138. In some embodiments, grease can be pre-applied to ramp portions 148 to reduce the amount of torque required and prevent corrosion and metallic bonding of the key flanges 132 to base 102. As remarked above, turning shaft 128 by application of force on handle 138 causes the curved surfaces of key flanges 132 to forcibly ramp up and over ramp portions 148 and then onto second surface portions 150.

At FIG. 2C, handle 138 has been turned with force to place distal end 134 of coupling member 120 against stop portions 152. Further turning of shaft 128 is prevented by distal end 134 of key member 130 abutting stop portions 152. As remarked above, compression of mounting foot 116 by the steps shown at FIGS. 2A-2C secures mounting foot 116 to base 102 by increasing frictional engagement of bottom surface 124 of mounting foot 116 to top surface 110 of base, thereby preventing movement of mounting foot 116.

The position shown at FIG. 2C is essentially a locked position of the coupling member 120 and does not require further handling for securement of mounting foot 116 to base 102. However, the coupling member can be unlocked to free mounting foot 116 for repositioning or maintenance of the roof structure. This can be accomplished by reversing the procedure shown at FIGS. 2A-2C. In some embodiments, coupling member 120 can be locked to mounting foot by one or more pins or fasteners to provide a secondary level of securement, and prevent unintended disassembly of system 100.

Figure 3A:
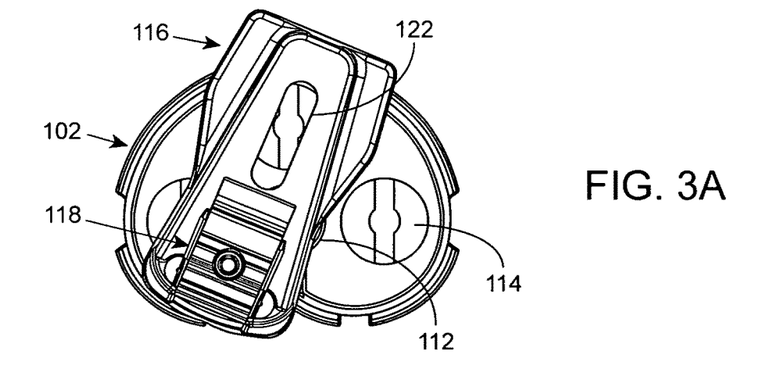
FIGS. 3A-3C show top views of a PV mounting system in use, according to some embodiments.
Figure 3B:
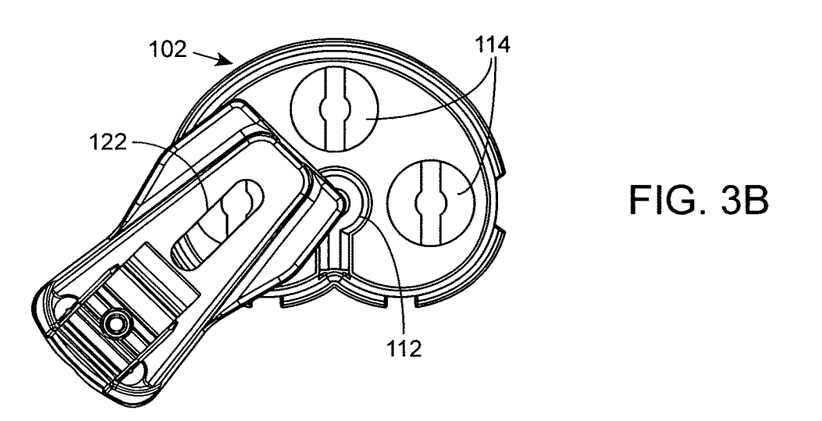
Figure 3C:
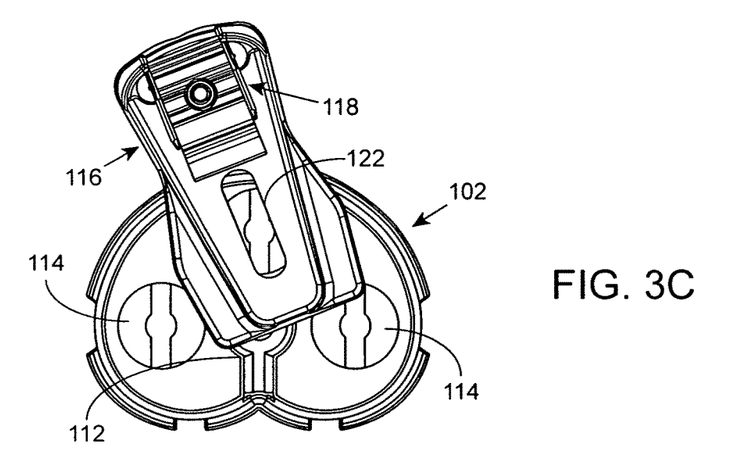

FIGS. 3A-3C depict various positions possible for securing mounting foot 116 base 102 and thereby adjusting the reach of PV module coupling device 118. As shown, three receptacles are provided, but more or less can also be provided. Advantageously, PV module coupling device 118 can be placed about 360 degrees of each of receptacles 114.

At FIG. 3A mounting foot 116 is coupled to central-most receptacle 114, and positioned such that PV module coupling device 118 is placed closely over counter bore 112, thus providing a centralized arrangement with respect to a lag bolt that fastens base 102 to a structure. However, due to the overlapping nature of the placement areas available for each receptacle, this position can be similarly achieved for each receptacle 114. This is advantageous when handle 138 may be in an undesirable position when fastened to one of receptacles 114, but not another.

At FIG. 3B mounting foot 116 is coupled to laterally positioned receptacle 114, and positioned such that PV module coupling device 118 is placed away from counter bore 112, and down roof, thus providing a non-centralized arrangement with respect to a lag bolt that fastens base 102 to a structure by way of counter bore 112. This can be advantageous when the optimal mounting point of base 102 requires counter bore 112 to be placed at a significant distance from PV module coupling device 118. Often this is required as the joining line between two PV modules, and hence the position of PV module coupling device 118, is not congruent with positions of roof rafters or other hard mounting points for base 102.

At FIG. 3C mounting foot 116 is coupled to central-most receptacle 114, and positioned such that PV module coupling device 118 is placed away from counter bore 112, and up roof. Hence, providing a non-centralized arrangement with respect to a lag bolt that fastens base 102 to a structure by way of counter bore 112.

Figure 4A:
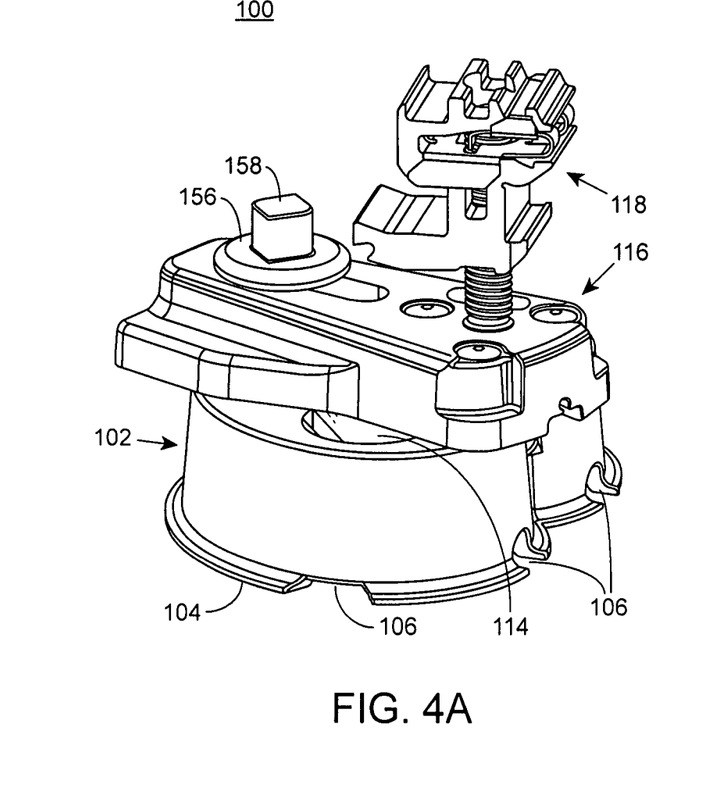
FIGS. 4A and 4B respectively show perspective and top views of a PV mounting system, according to some embodiments.
Figure 4B:
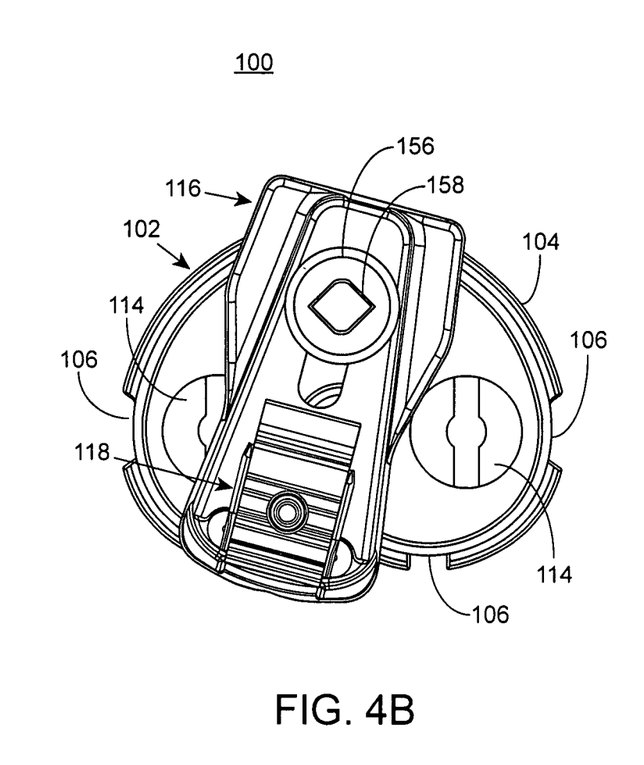

FIGS. 4A and 4B show an alternative arrangement of system 100 as compared to what is depicted at FIGS. 1A and 1B. Here, the major difference being the use of alternative coupling member 156, which differs from coupling member 120 in that handle 138 is not provided. In some cases, the use of a permanently extending handle may not be desirable or possible. Instead, drive portion 158 can be turned by a tool having a complimentary female attachment portion. In various embodiments, this tool may also be used to manipulate other system components such as interlocks, grounding lugs, and fasteners for combiner boxes.

Figure 5A:
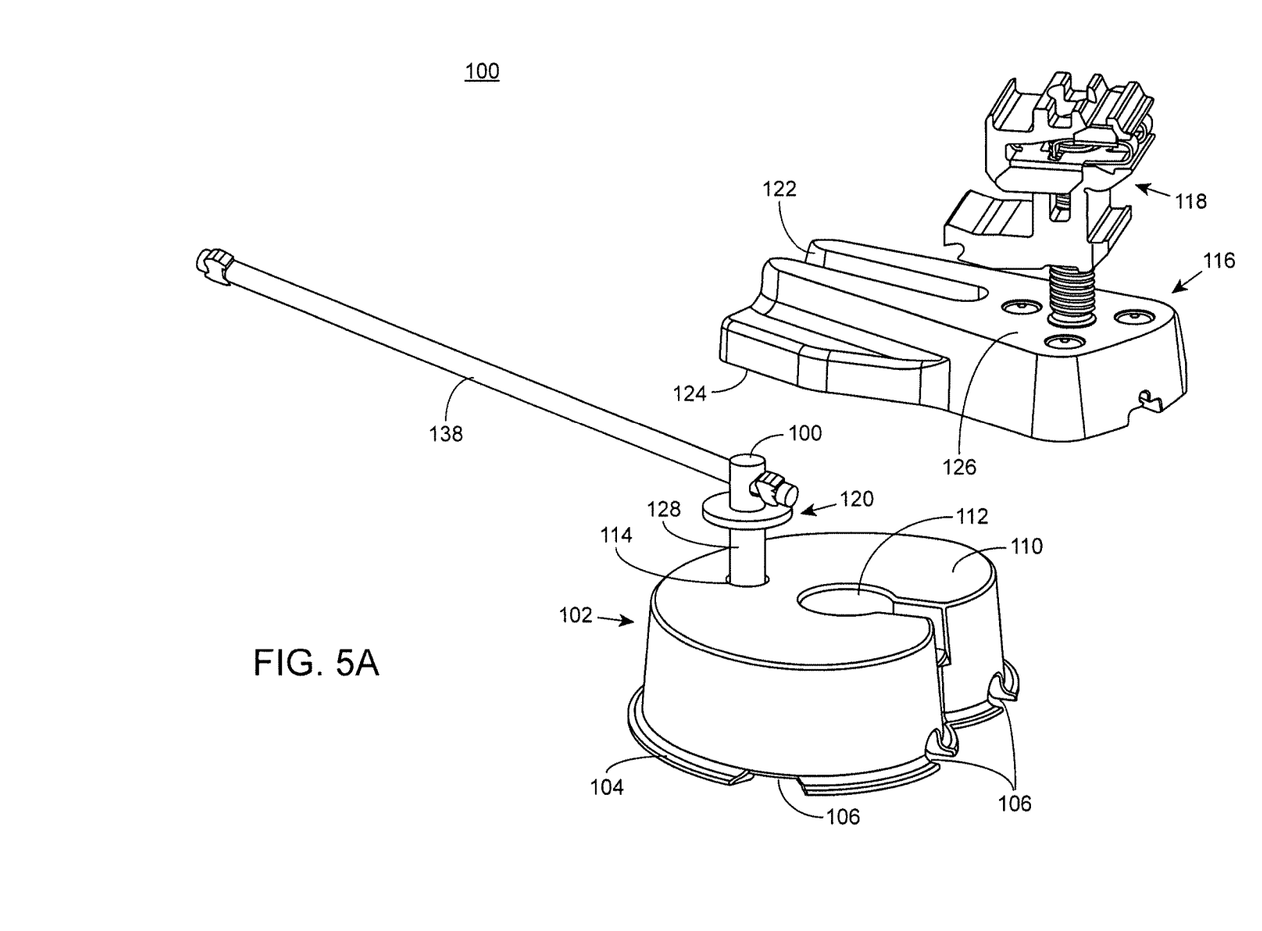
FIGS. 5A and 5B show top and bottom perspective views of a PV mounting system, according to some embodiments.
Figure 5B:
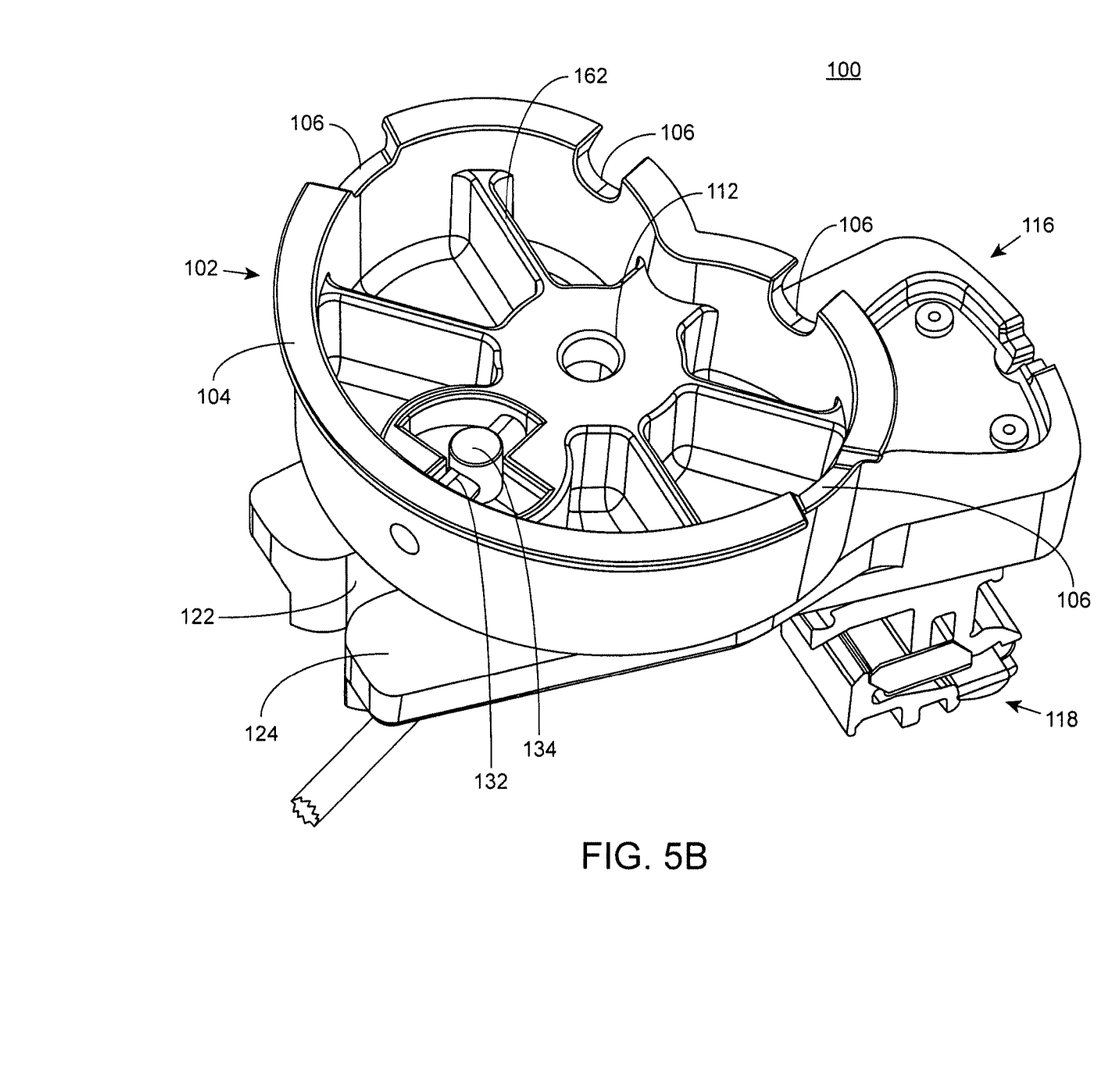

FIGS. 5A and 5B show an alternative arrangement of system 100 as compared to what is depicted at FIGS. 1A and 1B. Here, a captured arrangement is shown, where coupling member 120 is preassembled onto base 102. Handle 138 can be slid within coupling portion 160 for stowing and packaging base 102 prior to and after installation. To enable assembly of system 100, key flanges 132 are configured as a sub-shaft than can be assembled into shaft 134.

In some embodiments, key flanges 132 are pressed onto shaft 134 by an interference fit, and thus pre-assembled at a factory. In other embodiments, key flanges 132 are fastened into place at the work site, but before transfer to the mounting structure. Due to the pre-assembled nature of coupling member 120, only one of receptacle 114 can be provided. In addition, slot 122 of mounting foot 116 is open at one end to facilitate sliding of mounting foot 116 between coupling member 120 and base 102. The bottom side of base 102 can include ribs 162 to strengthen base 102.

Figure 7:
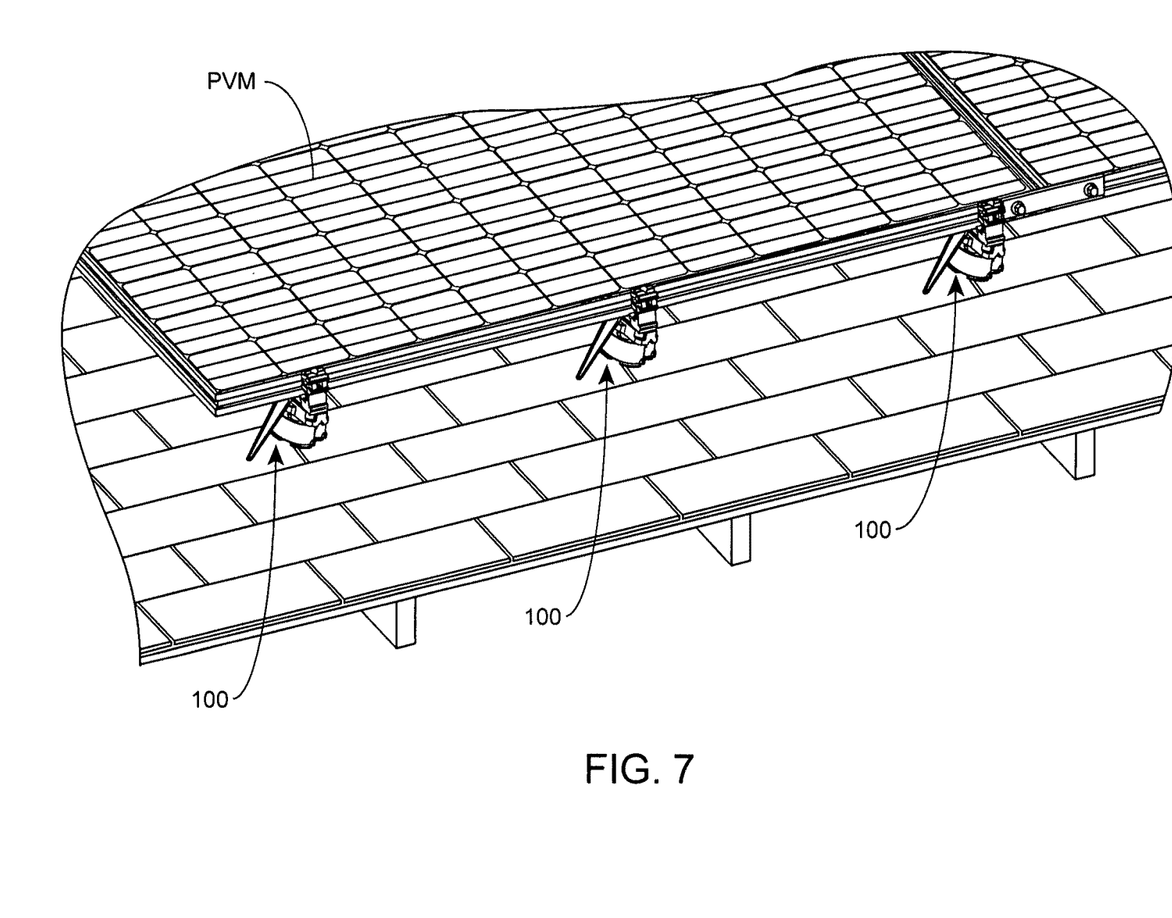
FIG. 7 shows a perspective view of PV mounting systems mounted to a structure, according to some embodiments.

FIG. 7 shows a plurality of systems 100 mounted to a roof and supporting a plurality of PV modules PVM. As shown, system may advantageously be utilized to support more than PV module PVM, although supporting more than one is not necessary. While system 100 is shown mounted to a sloped composite shingle roof, system 100 may be used on a variety of other structures.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments will be apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A mounting system comprising:
a base configured to mount to a structure, the base comprising at least one receptacle;
a foot adapted to couple with the base;
a photovoltaic (PV) module coupling device attached to the foot, the PV module coupling device being adapted to engage frames of at least two PV modules while maintaining a space in between them;
an elongated handle coupled to a coupling member, the coupling member being configured to secure the foot to the base by insertion of the coupling member through the foot and into the at least one receptacle and turning of the handle less than a full revolution to compress the foot between the base and a coupling surface of the coupling member;
wherein the at least one receptacle comprises an opening and at least one stop for limiting turning of the handle, and
wherein the at least one receptacle comprises a first surface portion, a second surface portion vertically displaced from the first surface portion and abutting the at least one stop, and a ramp portion leading from the first surface portion to the second surface portion.

2. The mounting system of claim 1, wherein the at least one stop is configured to limit revolution of the elongated handle to 90 degrees or less.

3. The mounting system of claim 1, wherein the coupling member comprises an elongated shaft and a key member attached to an end of the elongated shaft.

4. The mounting system of claim 1, wherein the key member comprises a plurality of curved portions configured to forcibly hold onto complimentary portions of the at least one receptacle.

5. The mounting system of claim 1, wherein the elongated handle is removably coupled to the coupling member.

6. A mounting system comprising:
a base configured to mount to a structure, the base comprising a plurality of receptacles;
a foot having a bottom surface and an upper surface, the bottom surface for engagement with the base;
a photovoltaic (PV) module coupling device mounted to the foot, the PV module coupling device being adapted to engage frames of at least two PV modules while maintaining a space in between them;
an elongated handle coupled to a coupling surface of a coupling member, the coupling member being configured to compress the foot between the base and the coupling surface by insertion of the coupling member through the foot and into one of the plurality of receptacles and turning of the handle less than 360 degrees;
wherein each receptacle comprises an opening and a stop for limiting turning of the handle, and
wherein the each receptacle comprises a ramp portion leading to the stop.

7. The mounting system of claim 6, wherein the coupling member comprises a key member configured to ramp over the ramp portion during the turn of the handle.

8. The mounting system of claim 6, wherein the stop is configured for limiting revolution of the elongated handle to 90 degrees or less.

9. The mounting system of claim 6, wherein the coupling member comprises an elongated shaft and key flanges attached to an end of the elongated shaft.

10. A mounting system comprising:
a puck configured to mount to a structure, the puck comprising an elevated surface having a plurality of receptacles;
a foot having a bottom surface and an upper surface, the bottom surface for frictional engagement with the elevated surface of the puck;
a photovoltaic (PV) module coupling device mounted above the upper surface of the foot, the PV module coupling device being adapted to engage frames of at least two PV modules while maintaining a space in between them;
a coupling member configured to maintain position of the foot against the base by insertion of the coupling member through the foot and into one of the plurality of receptacles and turning of the coupling member;
wherein the coupling member comprises an elongated shaft and key flanges attached to an end of the elongated shaft, and
wherein each receptacle comprises ramp portions for engagement with the key flanges.

11. The mounting system of claim 10, wherein the coupling member comprises a feature for coupling to an elongated handle.

12. The mounting system of claim 11, wherein the feature comprises a male protrusion.

13. The mounting system of claim 10, wherein each receptacle comprises a stop for limiting revolution of the elongated handle to 90 degrees or less.

14. The mounting system of claim 10, wherein each receptacle comprises stops arranged for preventing full revolution of the key flanges.

* * * * *